United States Patent
Boutami et al.

(10) Patent No.: US 10,677,988 B2
(45) Date of Patent: Jun. 9, 2020

(54) OPTICAL DEVICE WITH SEGMENTED RING MICRORESONATOR

(71) Applicant: COMMISSARIAT A L'ENERGIE ATOMIQUE ET AUX ENERGIES ALTERNATIVES, Paris (FR)

(72) Inventors: Salim Boutami, Grenoble (FR); Boris Taurel, Montbonnot-Saint-Martin (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 155 days.

(21) Appl. No.: 15/660,251

(22) Filed: Jul. 26, 2017

(65) Prior Publication Data

US 2018/0039024 A1 Feb. 8, 2018

(30) Foreign Application Priority Data

Jul. 27, 2016 (FR) .................................. 16 57222

(51) Int. Cl.
*G02B 6/293* (2006.01)
*G01N 21/77* (2006.01)
(Continued)

(52) U.S. Cl.
CPC ....... *G02B 6/29338* (2013.01); *G01N 21/255* (2013.01); *G01N 21/7746* (2013.01);
(Continued)

(58) Field of Classification Search
CPC ............ G02B 6/29338; G02B 6/12007; G02B 6/122; G01N 21/7746; G01N 21/255; G01N 2201/0873; G01N 21/77
See application file for complete search history.

(56) References Cited

U.S. PATENT DOCUMENTS 5,274,720 A * 12/1993 Yamamoto ............... G02B 6/10
359/569
9,563,016 B1 * 2/2017 Xu .......................... G02B 6/125
(Continued)

FOREIGN PATENT DOCUMENTS

WO WO 2014/161565 A1 10/2014

OTHER PUBLICATIONS

Donzella et al. ("Design and fabrication of SOI micro-ring resonators based on sub-wavelength grating waveguides", published Feb. 17, 2015, Optics Express, vol. 23, No. 4, pp. 4791-4803) (Year: 2015).*

(Continued)

*Primary Examiner* — Que Tan Le
*Assistant Examiner* — Jennifer D Bennett
(74) *Attorney, Agent, or Firm* — Oblon, McClelland, Maier & Neustadt, L.L.P.

(57) ABSTRACT

An optical device including a waveguide microresonator, laid out to guide a light beam along a closed loop optical path; and at least one injection and/or extraction waveguide, optically coupled to the microresonator for injection and/or extraction of the light beam. The microresonator is composed of a plurality of elementary waveguides with a spacing between them, and located one after the other to form a loop-shaped layout. Among other things, the invention increases the sensitivity of the microresonator to the surrounding medium.

13 Claims, 4 Drawing Sheets

(51) Int. Cl.
    *G01N 21/25*    (2006.01)
    *G02B 6/12*     (2006.01)
    *G02B 6/122*    (2006.01)

(52) U.S. Cl.
    CPC ......... *G02B 6/122* (2013.01); *G02B 6/12007* (2013.01); *G01N 2201/0873* (2013.01)

(56) References Cited

U.S. PATENT DOCUMENTS

| | | |
|---|---|---|
| 2008/0129997 A1 | 6/2008 | Yi et al. |
| 2009/0220184 A1 | 9/2009 | Goldring et al. |
| 2012/0301069 A1 | 11/2012 | Goldring et al. |
| 2015/0123017 A1* | 5/2015 | Yu .................. G02B 6/12007 250/503.1 |
| 2016/0069687 A1 | 3/2016 | Ciminelli et al. |
| 2016/0349456 A1* | 12/2016 | Grille ................ G02B 6/29389 |

OTHER PUBLICATIONS

Flueckiger et al. ("Sub-wavelength grating for enhanced ring resonator biosensor", published Jul. 1, 2016, Optics Express, vol. 24, No. 14, pp. 15672-15686) (Year: 2016).*

French Search Report dated Apr. 7, 2017 in French Application 16 57222 filed on Jul. 27, 2016 (with English Translation of Categories of cited Documents).

Damian Goldring, et al., "Highly dispersive micro-ring resonator based on one dimensional photonic crystal waveguide design and analysis", Optics Express, vol. 15, No. 6, pp. 3156-3168.

Clinton J. Smith, et al., "Sensing nitrous oxide with QCL-coupled silicon-on-sapphire ring resonators", Optics Express, 2015, vol. 23, No. 5, pp. 5491-5499.

U.S. Appl. No. 14/617,042, filed Feb. 9, 2015, 2015/0226612 A1, Ujwol Palanchoke, et al.

U.S. Appl. No. 14/865,564, filed Sep. 25, 2015, 2016/0091371 A1, Ujwol Palanchoke, et al.

U.S. Appl. No. 15/279,955, filed Sep. 29, 2016, 2017/0097301 A1, Anthony Lefebvre, et al.

U.S. Appl. No. 15/287,175, filed Oct. 6, 2016, 2017/0102323 A1, Salim Boutami, et al.

Donzella, V. et al. "Design and fabrication of SOI micro-ring resonators based on sub-wavelength grating waveguides" Optics Express, vol. 23, No. 4, XP055575629, 2015, 13 pages.

Flueckiger, J. et al. "Sub-wavelength grating for enhanced ring resonator biosensor" Optics Express, vol. 24, No. 14, XP055575645, 2016, 15 pages.

* cited by examiner

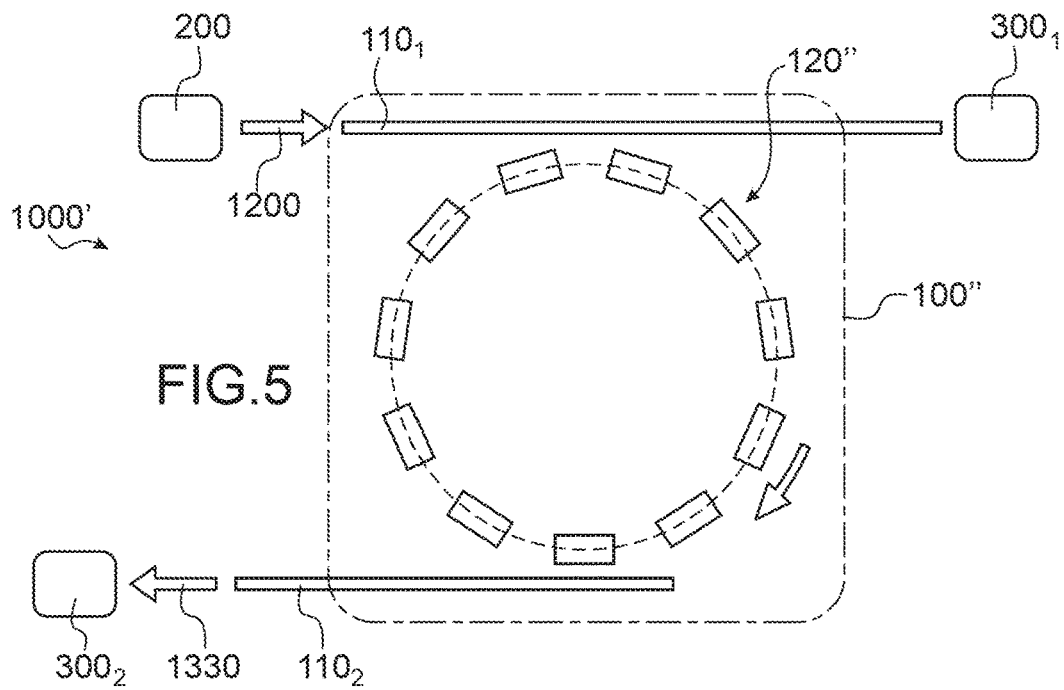
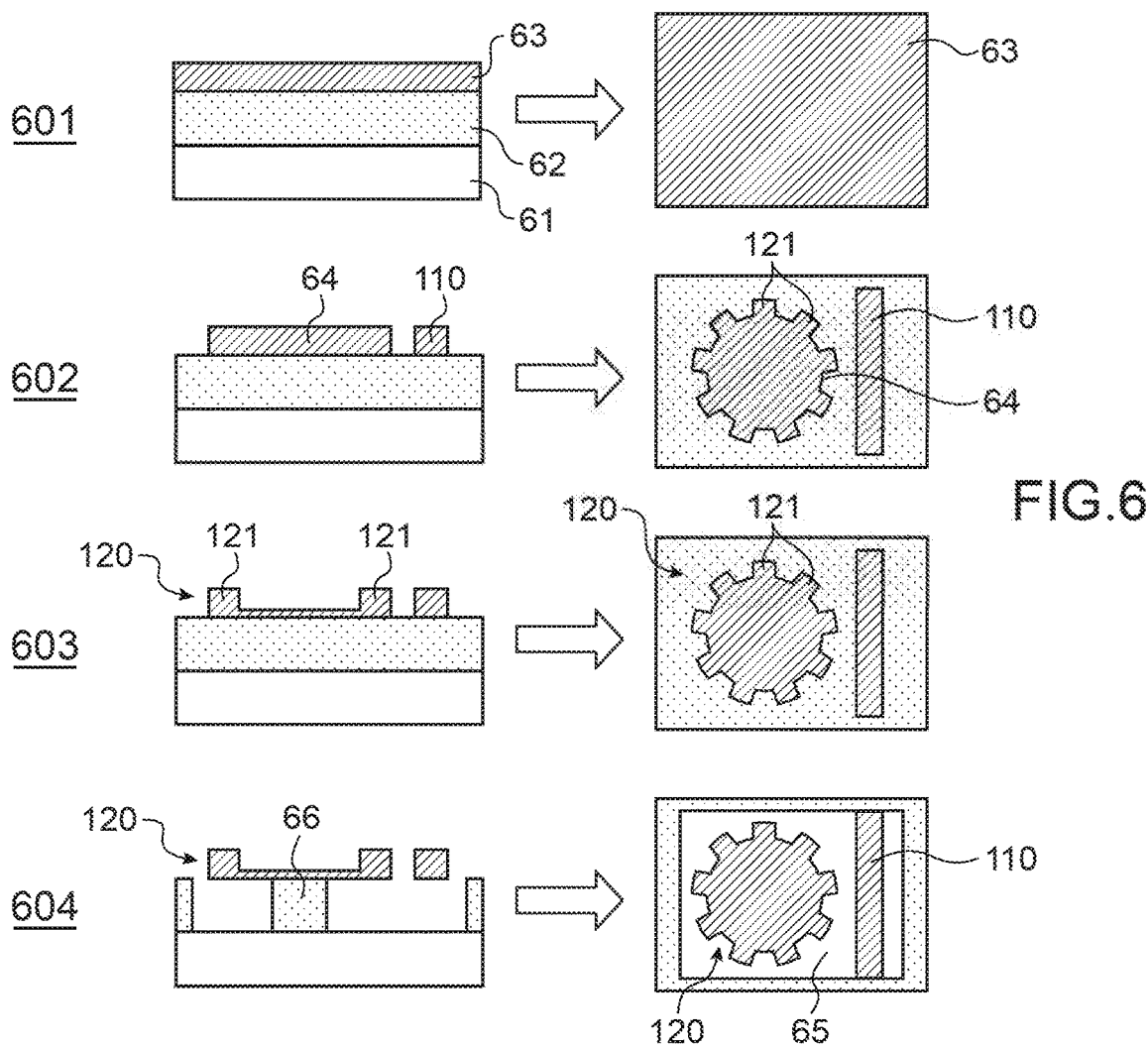

OPTICAL DEVICE WITH SEGMENTED RING MICRORESONATOR

TECHNICAL DOMAIN

The invention relates to an optical microresonator, among other things for the field of biological or chemical sensors, particularly for gas sensors using a waveguide resonator.

In such a sensor, a light beam interacts with the biological or chemical medium in which the microresonator is immersed.

This interaction results in optical losses and/or a shift in the resonant wavelength of the microresonator, so that said biological or chemical medium can be characterised.

For example, a concentration is measured, and particularly a gas concentration.

STATE OF PRIOR ART

Prior art is familiar with an optical device for a nitrous oxide sensor as described in the article "Sensing nitrous oxide with QCL-coupled silicon-on-sapphire ring resonators", Clinton J. Smith et al., OPTICS EXPRESS, Vol. 23, No. 5, pp 5491-5499.

The optical device disclosed in this article comprises an injection and extraction waveguide, and a waveguide microresonator.

The waveguide microresonator is composed of a waveguide curved into the shape of a ring, called a ring microresonator.

The curved waveguide has the special feature that it does have a cladding. During operation, the medium in which the microresonator is immersed acts as a cladding.

The injection and extraction waveguide is composed of a waveguide that extends in a straight line close to the ring microresonator, parallel to a tangent to the ring.

During operation, a light beam called the analysis beam is sent to the inlet of the injection and extraction waveguide.

At a resonant wavelength of the ring microresonator, the ring microresonator is optically coupled with the injection and extraction waveguide, by evanescent coupling.

In particular, evanescent coupling corresponds to an interaction between a guided mode of the injection and extraction waveguide, with a guided mode of the microresonator, which leads to an energy transfer between these two modes.

A resonant wavelength of the ring microresonator is a wavelength at which the phase shift due to one turn in the ring is a multiple of $2\pi$.

Thus, part of the analysis laser beam escapes to the ring microresonator in which it makes one or several turns before returning to the injection and extraction waveguide.

During its passage in the ring microresonator, this part of the analysis beam suffers optical losses due particularly to absorption by the medium surrounding the ring and acting as a cladding. The absorption rate depends on the concentration of nitrous oxide in this medium. The ring may also have radiation losses by curvature, particularly for small radii of curvature (radius of the same order as or less than the wavelength).

Thus, the analysis of light at the outlet from the injection and extraction waveguide can determine a loss ratio at the resonant wavelength, and a concentration of nitrous oxide can be deduced from it.

One disadvantage of this device is its low sensitivity that in this case corresponds to a small variation in the transmission ratio at the resonant wavelength when the composition of the surrounding medium changes.

One purpose of this invention is to propose an optical device, among other things for a biological or chemical sensor, using a waveguide microresonator and with improved sensitivity.

PRESENTATION OF THE INVENTION

This objective is achieved with an optical device, among other things for a biological or chemical sensor, comprising:
  a waveguide microresonator laid out to guide a light beam along a closed loop optical path; and
  at least one injection and/or extraction waveguide, optically coupled to the microresonator for injection and/or extraction of said light beam.

According to the invention, the microresonator is composed of a plurality of elementary waveguides with a spacing between them, and located one after the other to form a loop-shaped layout.

During operation, in the context of use for a biological or chemical sensor, the microresonator is immersed in the biological or chemical medium to be characterised.

This biological or chemical medium extends not only around the elementary waveguides forming a cladding for each of them, but also in the spaces between two elementary waveguides.

An interaction volume between light circulating in the microresonator and the surrounding biological or chemical medium is thus increased.

In other words, a lot of energy is impregnated by the surrounding medium, particularly between elementary waveguides.

Therefore, the sensitivity of the optical device according to the invention is higher than the sensitivity of a similar device in which the microresonator is composed of a ring microresonator like that described in the introduction.

Preferably, the gain in sensitivity is a factor of three or more.

In particular, with the invention, the variation of absorption, by the biological or chemical medium, of a light beam guided in the microresonator, when the composition of said medium varies, can be increased.

As a complement or as a variant, the invention can increase the variation of the effective index of guided mode in the microresonator, when the composition of said biological or chemical medium varies. This variation of the effective index induces a variation of the resonant wavelength of the microresonator. The resonant wavelength depends on the effective index of the mode guided in the microresonator. For example, for a circular optical path with radius R in the microresonator, we have $$\frac{2\pi}{\lambda} * N_{eff} * 2\pi R = m * 2\pi \qquad (1)$$

in which:
$N_{eff}$ is the effective index of the mode guided in the microresonator;
$\lambda$ is the resonant wavelength (wavelength of said guided mode); and
m is an integer greater than or equal to one.

The value of the resonant wavelength can also be used to characterise a biological or chemical medium, and particularly a liquid medium.

The invention also relates to a biological or chemical sensor comprising:

a light source, to output a light beam called the analysis beam;

an optical device according to the invention, in which one among the at least one injection and/or extraction waveguide is laid out to receive the analysis light beam and to transfer at least part of the analysis light beam to the microresonator, at a resonant wavelength of the microresonator; and at least one photodetector set out to receive a light beam emitted at the exit from said optical device, and resulting from the coupling between said injection and/or extraction waveguide and the microresonator.

BRIEF DESCRIPTION OF THE DRAWINGS

This invention will be better understood after reading the description of example embodiments given purely for information and that are in no way limitative, with reference to the appended drawings on which:

FIG. 5 diagrammatically illustrates a second embodiment of a biological or chemical sensor according to the invention; and FIG. 6 illustrates a method of manufacturing an optical device according to the invention.

DETAILED PRESENTATION OF PARTICULAR EMBODIMENTS

Figure 1:
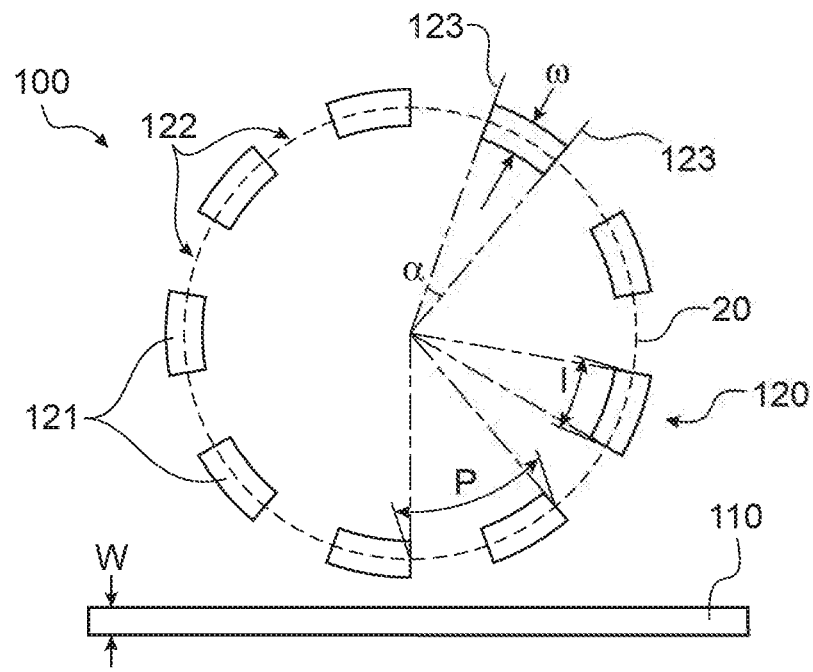
FIG. 1 diagrammatically illustrates a first embodiment of an optical device according to the invention.

FIG. 1 diagrammatically illustrates a first embodiment of an optical device 100 according to the invention?

The optical device 100 is advantageously designed to form part of a biological or chemical sensor as will be described below.

During operation, the optical device 100 is immersed in a biological or chemical medium.

In this case the optical device 100 comprises:

an injection and extraction waveguide 110, configured to guide a light beam called the analysis beam; and a waveguide microresonator 120 configured to guide at least a portion of the analysis beam along an optical path 20 in a closed loop.

According to the invention, the waveguide microresonator 120 is composed of a plurality of waveguide segments, called elementary waveguides 121.

The elementary waveguides 121 together define the optical path 20 followed by light in the microresonator, in this case a circular optical path (shown as a dashed line on FIG. 1). In other words, they are laid out in sequence in a ring shaped layout.

Several elementary waveguides are used with a space between them.

In other words, the entry to one elementary waveguide is not in direct physical contact with the exit from an adjacent elementary waveguide.

Each elementary waveguide is separated from the adjacent waveguides by a free space 122.

During operation, these free spaces 122 are occupied by the biological or chemical medium in which the microresonator 120 is immersed.

Each elementary waveguide 121 has no cladding, such that during operation, the biological or chemical medium in which they are immersed acts as a cladding.

Therefore each elementary waveguide 121 is advantageously composed of a single material.

This material is the same for all elementary waveguides 121.

Elementary waveguides are advantageously made of silicon or silicon nitride.

For example, they are made of silicon to guide a light beam in the infrared (wavelength longer than 1 μm, in particular between 1 μm and 10 μm).

As a variant, the elementary waveguides 121 are made of nitride, and particularly silicon nitride ($Si_3N_4$), to guide a light beam in the visible range (wavelength strictly shorter than 1 μm, and particularly between 0.4 μm and 0.8 μm).

It could be considered that the microresonator 120 forms a segmented ring microresonator, in other words a microresonator as described in the introduction, in which only some segments of the curved waveguide are kept and form the elementary waveguides.

During operation, light guided in the microresonator 120 passes partly in the surrounding biological or chemical medium when it propagates in an elementary waveguide 121, said medium acting as a cladding for this elementary waveguide 121.

Furthermore, light guided in the microresonator 120 fully extends in the surrounding biological or chemical medium when it propagates in a free space 122, passing from one elementary waveguide 121 to the next.

Consequently, the biological or chemical medium has a large influence on light guided in the microresonator 120, more than in a ring microresonator like that described in the introduction.

In particular, this higher influence results in a larger variation of absorption by said medium, when the composition of said medium varies.

When the refraction index of a component of the biological or chemical medium is high, for example more than 2, a variation in the concentration of this component in said medium results in a large variation in the refraction index. This variation in the refraction index affects the phase shift that occurs following one turn in the microresonator, and therefore the value of the resonant wavelength of the microresonator. Thus, the stronger influence of the surrounding medium in a microresonator according to the invention can result also in a greater variation of the value of the resonant wavelength when the composition of said medium varies.

The invention can thus increase the sensitivity of the microresonator, and therefore of an optical device and a biological or chemical sensor according to the invention, to the surrounding medium.

The microresonator 120 is located close to the injection and extraction waveguide 110.

At the microresonator 120, the injection and extraction waveguide 110 extends along a straight line parallel to a tangent to the microresonator.

The injection and extraction waveguide 110 extends outside the microresonator 120, without necessarily being in physical contact with it.

In the following, we will illustrate one non-limitative example in which there is a distance between the injection and extraction waveguide 110 and the microresonator 120.

The microresonator 120 and the injection and extraction waveguide 110 are optically coupled to each other by evanescent coupling.

During operation, the injection and extraction waveguide 110 receives at the input a light beam called the analysis beam At least part of the analysis beam is transferred in the waveguide microresonator 120, by evanescent coupling.

The part of the analysis beam transferred in the waveguide microresonator 120 is a signal with a wavelength equal to the resonant wavelength of the microresonator 120.

This may be all or some of the analysis beam.

A resonant wavelength of the microresonator is a wavelength at which the phase shift due to one turn in the microresonator is a multiple of $2\pi$. Preferably, only one resonant wavelength is exploited, named "the resonant wavelength".

Therefore the part of the analysis beam transferred into the microresonator forms the light beam guided by the microresonator. In other words, this part of the analysis beam corresponds to light guided in the microresonator 120, under the influence of the external environment, in this case the biological or chemical medium in which the microresonator is immersed.

In the example illustrated in FIG. 1, the device 100 comprises a single injection and extraction waveguide.

Thus, at least part of the analysis beam is transferred from the injection and extraction waveguide 110 to the waveguide microresonator 120, in which it makes several turns before returning in the same injection and extraction waveguide 110.

As described below in detail, not all light returns into the injection and extraction waveguide 110, due to losses during propagation in the microresonator 120. These losses may even be 100%.

Preferably, the injection and extraction waveguide 110 is composed of a single material, like the elementary waveguides 120, with the surrounding biological or chemical medium acting as the cladding.

This single material is advantageously the same as the material forming the elementary waveguides.

The description above describes use of the optical device 100 for a biological or chemical sensor.

As a variant, the optical device 100 can be used for other uses in which it is known that an optical resonator can be used. For example, the optical device 100 can be used for a movement sensor (displacement, acceleration, linear or rotation movement).

The formation of the microresonator according to the invention in several independent elements also presents advantages in the context of a movement sensor (higher sensibility to mechanical constraints, possibility to make an external mechanical element move between two elementary waveguides).

The following contains details of advantageous rules for the design of the optical device 100.

The microresonator, in this case in the form of a ring, advantageously has an outside radius less than or equal to 10 µm, and particularly less than or equal to 5 µm.

Preferably, all elementary waveguides have the same shape and the same dimensions.

The shape of an elementary waveguide 121 in this case is a portion of a straight cylinder with an annular base, this portion being delimited by two planes 123 receiving the generating line of the cylinder and together defining an angle $\alpha$.

Each elementary waveguide 121 is characterised by a height, a width w and a length l (in this case l is a curved length, measured at the centre of the elementary waveguide).

The different elementary waveguides 121 are distributed periodically in sequence, at a uniform pitch P, called the distribution pitch.

In this case, the pitch P designates a curved length corresponding to the curved length of an elementary waveguide 121 and a free space 122. In other words, it is the curved length of a portion of the optical path 20, followed by light at the centre of an elementary waveguide 121 and in the adjacent free space 122.

The pitch P is less than the central wavelength of the light beam guided in the microresonator, so that the structure made of independent elementary waveguides does not affect this light beam.

At this scale, light is only sensitive to an average refraction index between the index of elementary waveguides 121 and the index in the free spaces 122, and is not diffracted.

In other words, the core of the microresonator 120 behaves like a material with an average refraction index:

$$n_{moy} = \sqrt{\frac{l}{P}n_h^2 + \frac{P-l}{P}n_b^2} \quad (2)$$

in which:

l is the curved length of an elementary waveguide;
P is the distribution pitch of the elementary waveguides;
$n_h$ is the average refraction index in an elementary waveguide; and
$n_b$ is the average refraction index between two elementary waveguides, in other words the average refraction index of the biological or chemical medium surrounding the elementary waveguides.

Preferably, the pitch P in particular satisfies:

$$P < \frac{\lambda}{2n_{moy}} \quad (3)$$

in which:

$\lambda$ is the central wavelength of the light beam that propagates in the microresonator, or in other words a resonant wavelength of the microresonator, or in other words the exploited resonant wavelength of the microresonator.

Advantageously we obtain:

$$P < \frac{\lambda}{2n_h} \quad (4)$$

in which:

$n_h$ is the average refraction index in an elementary waveguide.

In this case, the elementary waveguides are composed of a single material, therefore $n_h$ is the refraction index of the elementary waveguides.

In practice, the distribution pitch P is advantageously less than 3 µm, and even less than 2 µm, or even 1 µm.

According to the invention, the microresonator 120 has a guided mode with effective index approximately equal to the effective index of a guided mode of the injection and extraction waveguide 110, and preferably exactly equal.

Approximately equal means equal within plus or minus 1%, or even within plus or minus 5% or even within plus or minus 10%.

As a reminder, the effective index of a mode, and particularly the effective index of a guided mode of a waveguide, is defined as follows:

$$N_{eff} = \beta * \frac{\lambda}{2\pi} \quad (5)$$

in which:

$N_{eff}$ is the effective index of the mode considered;
$\lambda$ is the wavelength of the light beam propagating in the waveguide; and
$\beta$ the phase constant of the waveguide.

The phase constant $\beta$ depends on the wavelength and the mode of the light beam propagating in the waveguide, and the properties of this waveguide (particularly refraction indexes and geometry).

The phase constant $\beta$ is defined by: $A(z)=A(0)\exp(\gamma z)$, in which z is an abscissa along a propagation path in the waveguide, A(z) is the complex amplitude as a function of z of a light beam propagating in the waveguide, and $\beta$ is the imaginary part of $\gamma$.

It can sometimes be considered that the effective index designates the average optical index of the medium as it is "seen" by a mode of the light beam propagating in the waveguide.

Preferably, the mode guided in the microresonator, respectively in the injection and extraction waveguide, is a zero order mode, usually quasi-Gaussian (fundamental mode).

Since the injection and extraction waveguide 110 is a single piece, and the microresonator 120 is segmented, the above condition about the effective indexes of guided modes advantageously means a condition on the widths of the injection and extraction waveguide 110 and the elementary waveguides 121 respectively.

Advantageously, we have:

$$w > W \quad (6)$$

in which:

w is the width of an elementary waveguide 121, measured in a plane orthogonal to the optical path 20 followed by light in the microresonator 120; and
W is the width of the injection and extraction waveguide 110, measured in a plane orthogonal to the optical path followed by light in the injection and extraction waveguide 110.

In practice, each elementary waveguide 121 preferably has a rectangular cross-section with height $h_1$ and width w, in planes orthogonal to the optical path 20 followed by light in the microresonator 120. Similarly, each injection and extraction waveguide 121 preferably has a rectangular cross-section with a height $h_1=h_2$ and width W, in planes orthogonal to the optical path followed by light in the injection and extraction waveguide 110.

Equation (6) is satisfied particularly when the injection and extraction waveguide 110 is composed of the same material as the elementary waveguides 121 and therefore has the same refraction index.

The widths w and W allowing to satisfy the above condition on the effective indexes of guided modes can be calculated precisely using electromagnetic simulation tools known to an expert in the subject. These simulation tools can be used to adjust the different parameters of the optical device 100, so as to satisfy said condition. These parameters are particularly the geometric parameters (distribution pitch P, curved length l of an elementary waveguide), and values of the refraction index (refraction indexes of the injection and extraction waveguide and refraction index of elementary waveguides).

In particular, the optimum value of the ratio between widths w and W can be determined.

The ratio of the width w divided by the width W is approximately equal to 2, is advantageously between 1.9 and 2.1, and even between 1.8 and 2.2.

Preferably, the ratio between the curved length l of an elementary waveguide and the distribution pitch P is approximately equal to 0.5. In particular, this ratio is advantageously between about 0.4 and 0.6, or even between 0.45 and 0.55, or exactly equal to 0.5.

In other words, the curved length of the free spaces is approximately the same as the curved length of the elementary waveguides, which gives the best technological compromise since neither the dimensions of the elementary waveguides nor the free spaces are too small.

Preferably, the ratio between the curved length l and the pitch P is equal to about 0.5, and also the ratio of the width w divided by the width W is approximately equal to 2.

Figure 2:
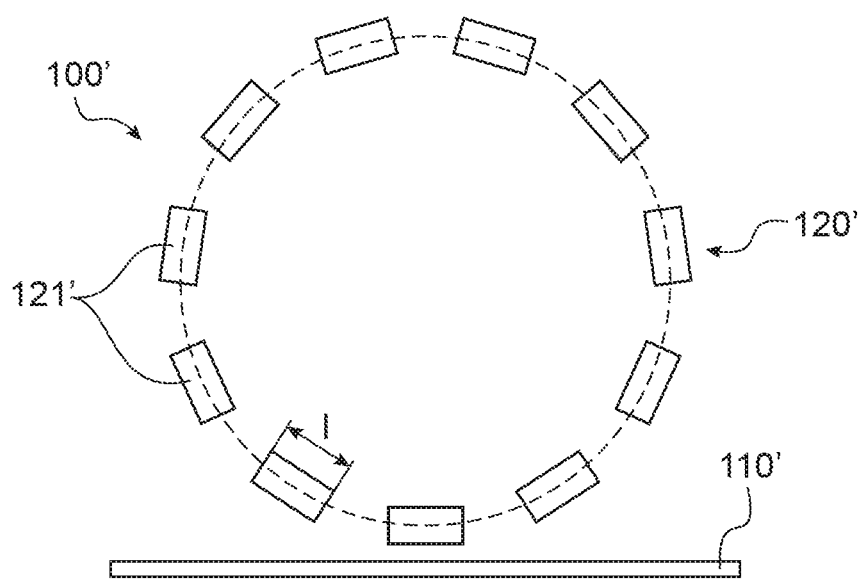
FIG. 2 diagrammatically illustrates a variant of the optical device in FIG. 1.

FIG. 2 diagrammatically illustrates a variant of the optical device in FIG. 1.

The only difference between the optical device 100' illustrated in FIG. 2 and the device in FIG. 1 is that each of the elementary waveguides 121' of the microresonator 120' of the optical device in FIG. 2 is in the form of a rectangular parallelepiped.

The dimensions of an elementary waveguide are defined in particular by the length l, that in this case is no longer curved.

Since the distribution pitch of elementary waveguides 121' is small, preferably less than 2 μm, the optical path of light guided in the microresonator 120' can be treated like a circular optical path.

According to this variant, the injection and extraction guide 110' preferably extends parallel to one of the elementary waveguides 121'.

Figure 3:
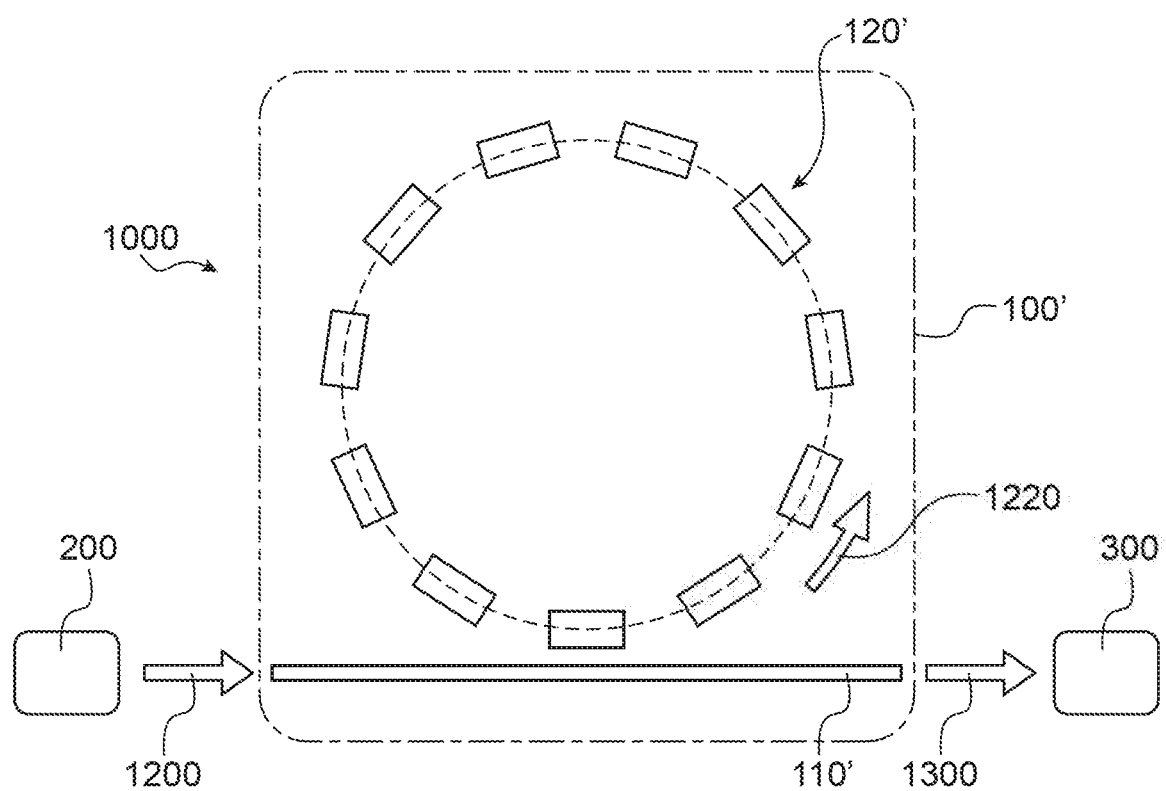
FIG. 3 illustrates a first embodiment of a biological or chemical sensor according to the invention, comprising the optical device shown in FIG. 2.

FIG. 3 illustrates a first embodiment of a biological or chemical sensor 1000 according to the invention, comprising an optical device according to the invention, in this case the optical device 100' shown in FIG. 2;

Such a sensor can be, for example and non-limitatively, a gas sensor, to measure the concentration of a predetermined gas in a medium, called a chemical medium.

The sensor 1000 according to the invention comprises:
a light source 200 adapted to the emission of a light beam called the analysis beam 1200, preferably a laser, adapted to the emission of a monochromatic beam;
the device 100'; and
a photodetector 300, adapted to measuring the light intensity of an incident beam.

The analysis beam 1200 is centred on a wavelength of about 4320 nm.

The light source 200 is located at the entry to the injection and extraction waveguide 110', in other words close to a first end of it, to inject the analysis beam 1200 into said waveguide 110'.

The analysis beam 1200 propagates in the injection and extraction waveguide 110' until it is close to the microresonator 120', where at least part 1220 of the analysis beam enters into the microresonator and makes several turns in it.

According to one embodiment, the analysis beam 1200 is a monochromatic beam centred on the resonant wavelength of the microresonator 120', and with a spectral width of less than or equal to 10 nm. In this case, the part 1220 of the analysis beam that enters the microresonator 110' is actually the entire analysis beam 1200.

As a variant, the analysis beam is a wide spectrum beam with a spectral width of more than 10 nm, for example more than 100 nm. In this case, the part 1220 of the analysis beam that enters the microresonator 110' is a spectral selection of the analysis beam, centred on the resonant wavelength of the microresonator 120.

During its transit in the microresonator 120', said part 1220 of the analysis beam is subject to losses due to:
- the curvature of the optical path, leading to losses towards radiation modes;
- possibly, the roughness of elementary waveguides (minor losses); and
- especially, absorption by the surrounding biological or chemical medium.

Absorption by the surrounding biological or chemical medium is particularly important when said analysis beam 1220 is confined for a long time (as a result of making several turns) in a compact component (the microresonator).

Furthermore, the ingenious structure of the microresonator according to the invention further increases absorption by the surrounding environment.

Said part 1220 of the analysis beam then returns into the injection and extraction waveguide 110', reduced by losses due to transit in the microresonator 120'. As described above, the return into the injection and extraction waveguide 110' also takes place by evanescent coupling.

Therefore the light beam 1300 at the exit from the injection and extraction waveguide 110' corresponds to the analysis beam 1200, reduced by losses in the microresonator.

The only one of the types of losses listed above, that varies strongly as a function of the composition of the surrounding biological or chemical medium, is absorption by this medium.

Consequently, the analysis of the light beam 1300 at the exit from the injection and extraction waveguide 110' provides information about said biological or chemical medium, for example a concentration of a gas of interest.

This analysis is made using the photodetector 300 located at the exit from the injection and extraction waveguide 110', in other words close to a second end of it, to receive the light beam 1300 that exits from said waveguide 110'.

Preferably, the distance between the injection and extraction waveguide 110' and the microresonator 120' according to the invention, is adapted such that transmission by the optical device according to the invention at the resonant wavelength of the microresonator is minimal, for a zero concentration of this gas of interest in the surrounding medium.

The term "critical coupling" is often used to denote coupling associated with this minimum transmission, for example corresponding to a transmission ratio of less than 10%.

Transmission at the resonant wavelength of the microresonator increases as the concentration of the gas of interest in the surrounding medium increases.

In practice, critical coupling is reached when the distance between the injection and extraction waveguide and the microresonator is less than the distance associated with critical coupling in a device according to prior art as described in the introduction.

According to the invention, the distance between the injection and extraction wavelength 110' and the microresonator 120' is for example about 50 nm, and between 70 nm and 30 nm (distance measured edge to edge).

Figure 4A:
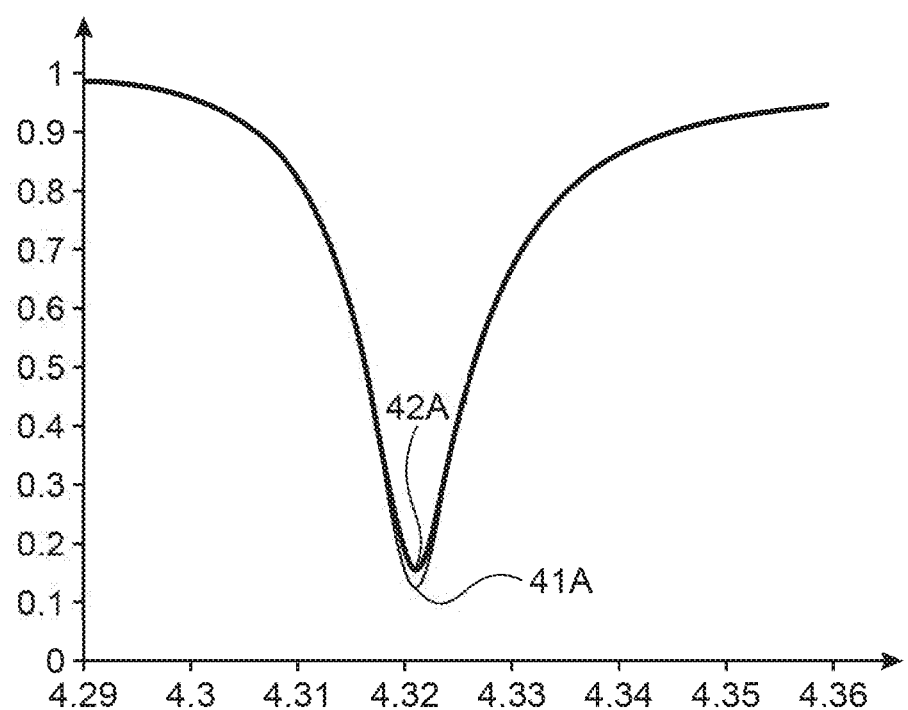
FIGS. 4A and 4B represent a comparison of the sensitivity of a chemical sensor according to prior art and according to the invention, respectively.
Figure 4B:
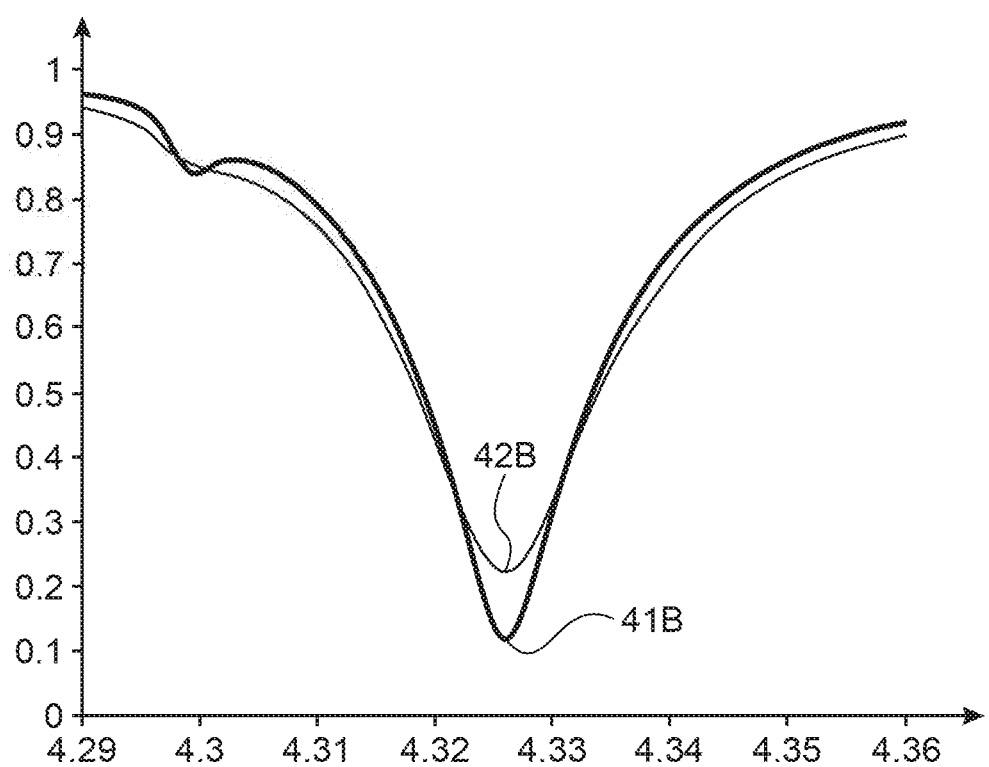

FIGS. 4A and 4B represent transmission spectra around the resonant wavelength for a gas sensor according to prior art as described in the introduction and for a gas sensor according to the invention as illustrated in FIG. 3, respectively.

In both cases, the injection and extraction waveguide and the microresonator are made of silicon with a refraction index $n_h=3.4$, and the analysis beam is centred on about 4.3 μm, to measure the concentration of carbon dioxide ($CO_2$) in the surrounding medium.

The case of a wide spectrum analysis beam is represented herein to facilitate understanding of the invention.

In both cases, the outside diameter of the microresonator is small, and is preferably less than 20 μm, and even less than 10 μm.

The two microresonators have the same quality factor at resonance, since residence times of photons in the microresonators are the same.

It will be noted that in this case the minimum quality factor is limited by losses due to curvature.

FIG. 4A corresponds to the gas sensor according to prior art.

The abscissa is graduated in μm, and represents the wavelength.

The ordinate is unitless, and represents a transmission rate varying from 0 to 1.

Curve 41A applies to a concentration of $CO_2$ equal to 0 ppm (parts per million), and its minimum transmission is about 0.1 at about 4.32 μm.

Curve 42A applies to a concentration of $CO_2$ equal to 1000 ppm, and its minimum transmission is about 0.15 at about 4.32 μm.

The variation of the transmission ratio between the two concentrations 0 ppm and 1000 ppm is 3.24%.

We also determined the variation of the transmission ratio between the two concentrations 0 ppm and 100 ppm, that is equal to 0.34%.

FIG. 4B corresponds to the gas sensor according to the invention.

Curve 41B applies to a concentration of $CO_2$ equal to 0 ppm, and its minimum transmission is 0.1 at about 4.33 μm.

Curve 42B applies to a concentration of $CO_2$ equal to 1000 ppm, and its minimum transmission is 0.22 at about 4.33 μm.

The variation of the transmission ratio between the two concentrations 0 ppm and 1000 ppm is 10.23%.

We also determined the variation of the transmission ratio between the two concentrations 0 ppm and 100 ppm, that is equal to 1.15%.

Thus, for each gas concentration, the variation of the transmission ratio at the resonant wavelength between said gas concentration and a zero concentration of this gas, is multiplied by 3 as a result of the invention.

Therefore the invention makes it possible to improve the sensitivity of a gas sensor. The sensitivity is increased by a factor of at least 3, compared with a sensor of the same type according to prior art.

FIG. 5 illustrates a second embodiment of a biological or chemical sensor 1000' according to the invention, comprising the optical device 100" according to the invention.

The optical device 100" corresponds to the optical device described with reference to FIG. 2, except that instead of the injection and extraction waveguide, it comprises an injection waveguide $110_1$ and an extraction waveguide $110_2$ separate from each other.

In this case, the injection waveguide $110_1$ and the extraction waveguide $110_2$ are parallel to each other and both are coupled to the microresonator $120''$ by evanescent coupling.

The light source 200 is located close to the entry to the injection waveguide $110_1$.

A first optional photodetector $300_1$, is placed at the exit from the injection waveguide $110_1$, to detect a signal as described with reference to FIG. 3. In this case, the injection waveguide $110_1$ can also be called the injection and extraction waveguide.

Here, a second photodetector $300_2$ is located close to the exit from the extraction waveguide $110_2$. In this case, the exit from the extraction waveguide $110_2$ is at the end of said waveguide, that is located on the same side of the microresonator as the light source 200.

During operation, the light source 200 emits the analysis beam 1200 that propagates in the injection waveguide $110_1$. Part of the analysis beam at the resonant wavelength of the microresonator is transferred to the microresonator before being coupled to the extraction waveguide $110_2$ and then detected by the photodetector $300_2$.

Therefore this photodetector $300_2$ only receives part 1330 of the analysis beam that transited through the microresonator.

The photodetector $300_2$ is particularly advantageous when the light source 200 is a wide band source. In this case, although the analysis beam is wide band, the photodetector $300_2$ receives a monochromatic signal at the resonant wavelength of the microresonator. The photodetector $300_2$ is then more sensitive to the effect of the surrounding medium because it only receives the wavelength affected by this medium and that transits in the microresonator.

On the other hand, the optional photodetector $300_1$ receives a wide band signal in which the effect of the surrounding medium at the resonant wavelength of the microresonator is embedded in the middle of wavelengths not affected by said medium.

The use of a wideband signal can be advantageous, for example when the value of the resonant wavelength of the microresonator is not known precisely, since it is influenced by the composition of the surrounding medium.

This influence that is negligible in a low index medium such as a gas medium, is larger in a high medium index such as a liquid medium.

Therefore the sensor 1000' is advantageously a sensor to identify a biological or chemical species and/or to determine its concentration, in a liquid medium.

It will be noted that the injection and extraction waveguide 110 or 110' mentioned with reference to FIGS. 1 to 3, the injection waveguide $110_1$, and the extraction waveguide $110_2$, are all waveguides optically coupled to the microresonator by evanescence. Each of these waveguides can be referred to as the "injection and/or extraction" waveguide.

FIG. 6 diagrammatically illustrates an example of a method of fabricating an optical device according to the invention, particularly a device 100 like that described with reference to FIG. 1.

At the left, the device currently being fabricated is shown in a sectional view.

At the right, the device currently being fabricated is shown in a top view.

The manufacturing method uses a Silicon On Insulator (SOI) stack composed of three superposed layers, namely a substrate 61 (for example made of silicon), an intermediate layer 62 made of silicon dioxide, and a top layer 63 made of silicon (starting point 601, in FIG. 6).

During a first step 602, the silicon top layer 63 is etched over its entire thickness, to form the injection and extraction waveguide 110 and a notched silicon disk 64. Each notch in the notched disk 64 will form one elementary waveguide 121 of the microresonator.

The process according to the invention then includes a step 603 to etch the disk 64, over only part of its thickness. During this step 603, a central region of the disk 64 is etched to form the microresonator 120.

The etching keeps a thin thickness in the central region of the disk 64, to mechanically retain the microresonator 120, and particularly to retain the elementary waveguides 121 firmly in position relative to each other.

According to one variant not shown, a filled disk (rather than a notched disk) is etched in step 602. In step 603, the filled disk is etched over part of its thickness in a central region and in annular regions of it. The elementary waveguides are thus formed in step 603, in this case located on a thin residual disk.

Finally, the intermediate layer 62 is etched over its entire thickness in a step 604, to form a cavity 65 under the microresonator 120 and the injection and extraction waveguide 110. The etching keeps a pillar 66 under the microresonator 120 to hold the microresonator 120 suspended above the substrate 61. The pillar 66 is approximately centred on the centre of the microresonator 120.

The intermediate layer remaining around the cavity 65 is used particularly to hold the injection and extraction waveguide 110 mechanically in suspension above the substrate 61.

In this case, etching is time-controlled wet etching.

Each etching preferably uses an etching mask.

In practice, the different elementary waveguides of a microresonator according to the invention are advantageously connected to each other by a thin layer of material that extends at least in a central region of the microresonator. This small thickness of material can extend directly under the microresonator under a central region of the microresonator as far as under the elementary waveguides.

The microresonator bears on a central pillar starting from the centre of this small thickness of material. Preferably, the width of the central pillar is smaller than the width of the microresonator, and not more than half the size.

The invention is not limited to the examples described above, and many variants of it can be made without going outside the framework of the invention.

For example, the elementary waveguides are not set out in the form of a ring, and another shape of closed loop is used instead.

For example, the layout of the elementary waveguides may be in the form of two half-rings connected by two segments, or four quarter rings connected by four segments.

The optical device according to the invention may also include a plurality of microresonators according to the invention, optically coupled to each other by evanescent coupling.

The sensor comprising such an optical device may be a gas sensor, or a sensor for any other chemical element in a gas or liquid medium. In particular, it may be a concentration sensor, for example a sensor of the $CO_2$ concentration in a gas medium, or a sensor of the glucose concentration in a liquid medium.

The light sensor and the photodetector of the sensor according to the invention can be integrated with the optical sensor on the same substrate, or they can be installed elsewhere.

FIGS. 3 and 5 show the example of sensors in which the elementary waveguides are straight segments. As a variant, they may be in the form of rounded segments, as in FIG. 1.

The invention claimed is:

1. An optical device comprising:
a waveguide microresonator, laid out to guide a light beam along a closed loop optical path; and
at least one injection and/or extraction waveguide, optically coupled to the microresonator for injection and/or extraction of said light beam;
wherein the microresonator includes a plurality of elementary waveguides with a spacing between them, and located one after another and distributed periodically in sequence, at a uniform distribution pitch, to form a loop-shaped layout, wherein the distribution pitch is less than:

$$\frac{\lambda}{2n_h}$$

wherein λ is the central wavelength of the guided light beam in the microresonator; and
$n_h$ the average refraction index of the plurality of elementary waveguides.

2. The device according to claim 1, wherein each of the plurality of elementary waveguides is separated from an adjacent elementary waveguide of the plurality of elementary waveguides by a free space which is configured to be occupied by a gas or liquid medium.

3. A biological or chemical sensor, comprising:
a light source, to output an analysis light beam;
an optical device according to claim 1, wherein one among the at least one injection and/or extraction waveguides is laid out to receive the analysis light beam and to transfer at least part of the analysis light beam to the microresonator, at a resonant wavelength of the microresonator; and
at least one photodetector, configured to receive a light beam emitted at an exit from said optical device, and resulting from coupling between said injection and/or extraction waveguide and the microresonator.

4. The biological or chemical sensor according to claim 3, wherein the optical device comprises an injection and/or extraction waveguide, and wherein:
the light source is located close to the entry to the injection and/or extraction waveguide, and
one among the at least one photodetector is arranged at the exit from the injection and/or extraction waveguide, configured to receive a signal corresponding to what remains of the analysis light beam after at least part of the analysis light beam has transited in the microresonator.

5. An optical device according to claim 1, further comprising a substrate and a central pillar, wherein the waveguide microresonator is suspended above the substrate bearing on the central piller.

6. An optical device comprising:
a waveguide microresonator, laid out to guide a light beam along a closed loop optical path; and
at least one injection and/or extraction waveguide, optically coupled to the microresonator for injection and/or extraction of said light beam;
wherein the microresonator includes a plurality of elementary waveguides with a spacing between them, and located one after another to form a loop-shaped layout, wherein each of the plurality of elementary waveguides is a same width, and wherein the width of each of the plurality of elementary waveguides is strictly more than the width of the injection and/or extraction waveguide.

7. The device according to claim 6, wherein a ratio of the width of the plurality of elementary waveguides, divided by the width of the injection and/or extraction waveguide, is between 1.8 and 2.2.

8. The device according to claim 6, wherein the width of the plurality of elementary waveguides and the width of the injection and/or extraction waveguide are adapted such that the injection and/or extraction waveguide has a guided mode with effective index equal to the effective index of a guided mode of the microresonator, within plus or minus 10%.

9. The device according to claim 6, wherein each of the plurality of elementary waveguides is separated from an adjacent elementary waveguide of the plurality of elementary waveguides by a free space which is configured to be occupied by a gas or liquid medium.

10. The device according to claim 9, wherein the plurality of elementary waveguides are distributed periodically in sequence, at a uniform distribution pitch.

11. A biological or chemical sensor, comprising:
a light source, to output an analysis light beam;
an optical device according to claim 6, wherein one among the at least one injection and/or extraction waveguides is laid out to receive the analysis light beam and to transfer at least part of the analysis light beam to the microresonator, at a resonant wavelength of the microresonator; and
at least one photodetector, configured to receive a light beam emitted at an exit from said optical device, and resulting from coupling between said injection and/or extraction waveguide and the microresonator.

12. The biological or chemical sensor according to claim 11, wherein the optical device comprises an injection and/or extraction waveguide, and wherein:
the light source is located close to the entry to the injection and/or extraction waveguide, and
one among the at least one photodetector is arranged at the exit from the injection and/or extraction waveguide, configured to receive a signal corresponding to what remains of the analysis light beam after at least part of the analysis light beam has transited in the microresonator.

13. An optical device according to claim 6, further comprising a substrate and a central pillar, wherein the waveguide microresonator is suspended above the substrate bearing on the central pillar.

* * * * *